United States Patent [19]
Windett et al.

[11] 3,813,960
[45] June 4, 1974

[54] ENERGY ABSORBING STEERING COLUMN

[75] Inventors: Robert Michael Windett, Hockley; Anthony John Martin, Southend-on-Sea, both of England

[73] Assignee: Ford Motor Company, Dearborn, Mich.

[22] Filed: Dec. 26, 1972

[21] Appl. No.: 318,294

[52] U.S. Cl. .................................................. 74/492
[51] Int. Cl. .............................................. B62d 1/18
[58] Field of Search .............................. 74/492, 493

[56] References Cited
UNITED STATES PATENTS
3,373,965  3/1968  Bien et al. ...................... 74/492 UX
3,394,613  7/1968  Curtindale ............................ 74/492
3,621,732  11/1971  Kaniut .................................. 74/492

Primary Examiner—Allan D. Herrmann
Attorney, Agent, or Firm—Keith L. Zerschling; Clifford L. Sadler

[57] ABSTRACT

This disclosure relates to an energy absorbing steering column assembly and support structure, and more particularly to a breakaway support bracket. According to the presently preferred embodiment, a bracket connected to the steering column has rearwardly opening recesses with rearwardly diverging edges. Slugs with shearable plastic inserts engage the diverging edges and are secured to a vehicle body structure. Under a forwardly directed impact load, the plastic material will shear and the bracket will be free to move forwardly relative to the slugs and the body structure.

7 Claims, 4 Drawing Figures

ENERGY ABSORBING STEERING COLUMN

BACKGROUND OF THE DISCLOSURE

This disclosure relates to a breakaway support assembly for a collapsible energy absorbing steering column.

It is known in the prior art to provide a breakaway support assembly in which a plurality of slugs are slidable in slots or recesses in a bracket. The slugs are bolted to the vehicle and the bracket is secured to the steering column. When energy absorbing steering column collapses under an impact load, the bracket slides relative to the slugs until it becomes completely disengaged. This arrangement functions well if the impact is aligned with the steering column but oblique impact loads against the steering wheel produce side loads of the bracket against the slugs thereby significantly increasing the force level at which the steering column assembly begins to collapse.

BRIEF SUMMARY OF THE DISCLOSURE

According to the presently preferred embodiment of this invention, a breakaway support assembly has the following features:
  a. a plurality of tapered slugs, each adapted to be secured to a vehicle body structure, are each mounted in a respective recess in a bracket adapted to be fixed to a steering column;
  b. the tapered sides of each slug are formed with a groove;
  c. the grooves in the slugs receive opposed divergent edges of the respective recesses in the bracket;
  d. the grooves and the edges are each inclined at an acute angle to the longitudinal direction of the vehicle and diverge toward the rear of the vehicle when the support assembly is in use; and
  e. the slugs are connected to the bracket by frangible connecting means arranged to release the slugs from the bracket under impact conditions and permit the bracket to move relatively to the slugs.

BRIEF DESCRIPTION OF THE DRAWINGS

The invention will now be described with reference to the accompanying drawings, in which.

DETAILED DESCRIPTION OF THE PREFERRED EMBODIMENT

Figure 1:
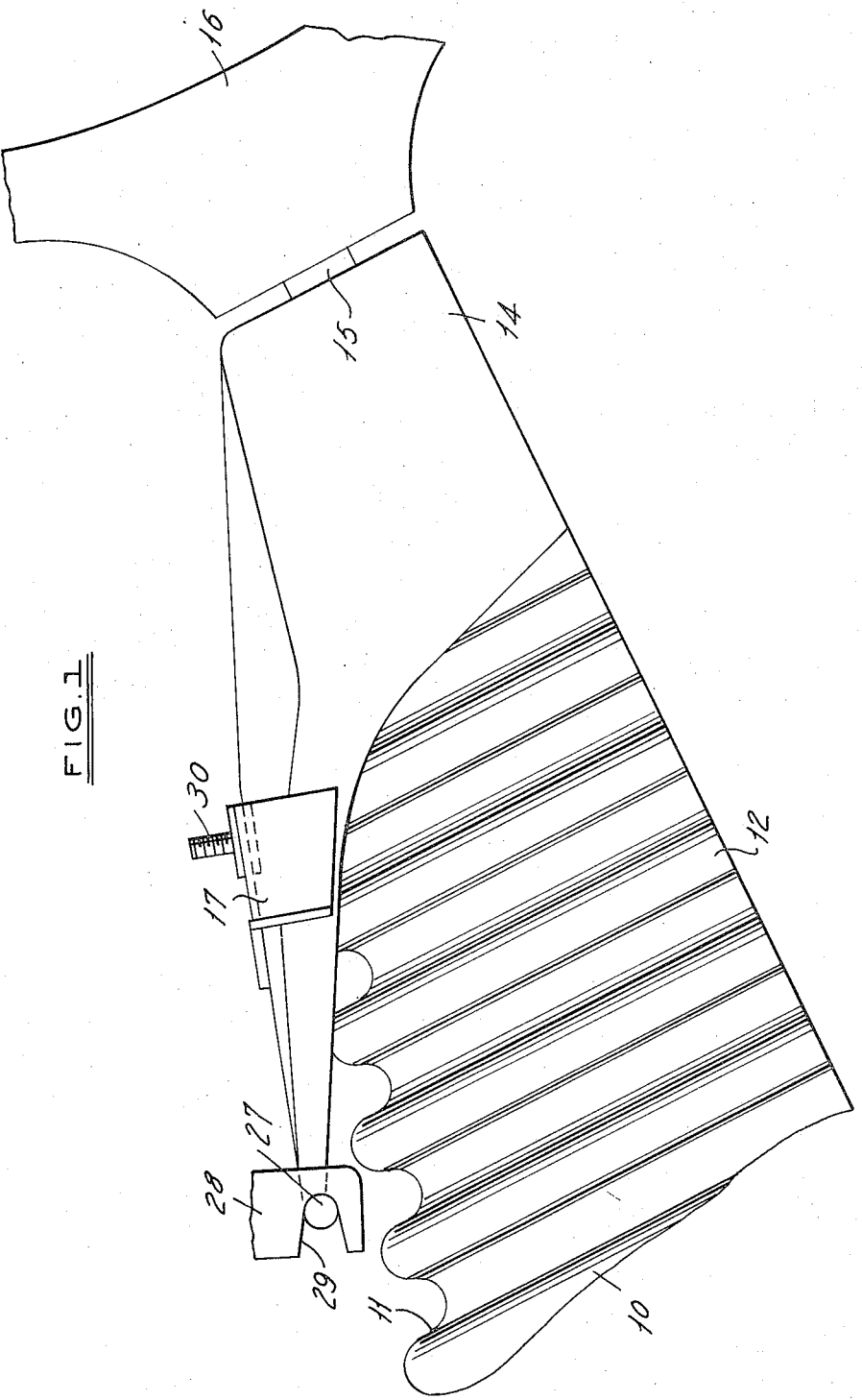
FIG. 1 is a side view of the upper part of a collapsible steering column assembly in a motor vehicle having a support assembly embodying the invention.
Figure 2:
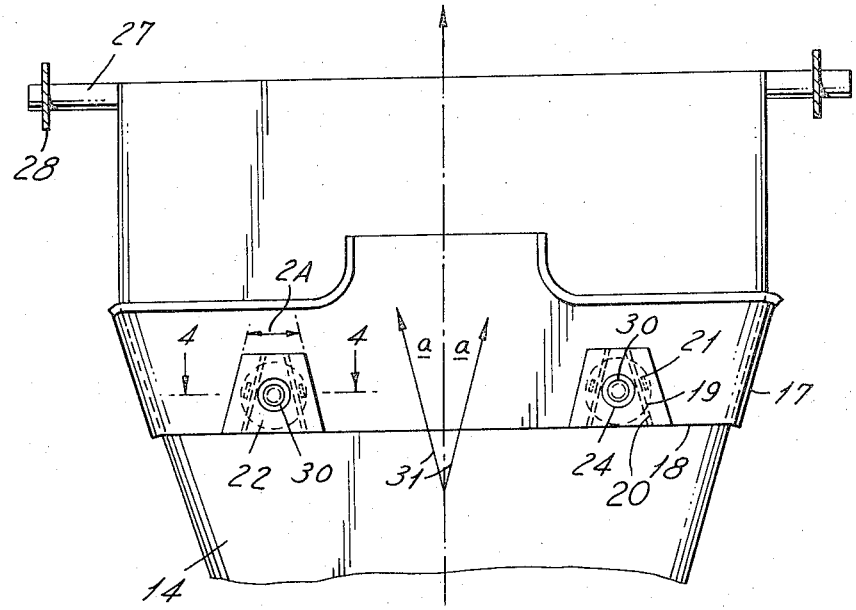
FIG. 2 is a fragmentary plan view of the support assembly.
Figure 3:
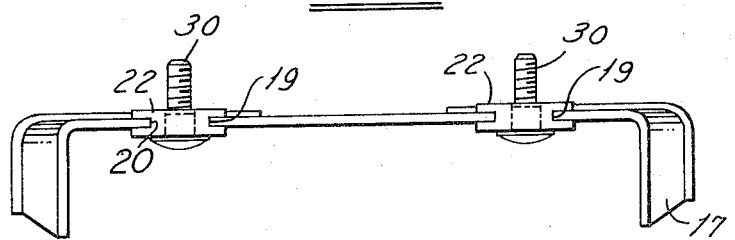
FIG. 3 is an elevation of the support assembly looking in the direction of forward motion of the vehicle.
Figure 4:
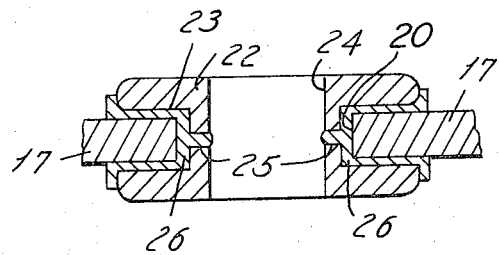
FIG. 4 is a sectional view taken along the section line 4—4 in FIG. 2.

Referring now to the drawings, wherein the presently preferred embodiment of this invention is illustrated, FIG. 1 discloses an energy absorbing steering column assembly and associated support structure. In this embodiment, a motor vehicle has a collapsible energy absorbing steering column assembly similar to that described in U.S. application Ser. No. 350,436 filed Apr. 12, 1973 and entitled "Energy Absorbing Steering Column Assembly" (a continuation of application Ser. No. 169,397 filed Aug. 5, 1971 and now abandoned)."

The principal energy absorbing member of the steering column is an extended pedal box structure 10 of generally inverted U-section. The pedal box 10 is formed by an upper member 11 of corrugated sheet material secured at each side to side members 12, also of corrugated sheet material.

The upper rearward end of the structure 10 is fixed to a housing 14. The housing 14 carries a steering shaft bearing (not shown) through which extends a telescopically collapsible steering shaft 15. A steering wheel 16 is fixed to the steering shaft 15.

A bracket 17 is welded to the housing 14. The bracket 17 has a rear edge 18 formed with two recesses or openings 19 which have straight edges 20. The edges 20 diverge toward the rear of the vehicle and each is inclined at an acute angle $a$ to the direction of forward motion of the vehicle. Each edge 20 is formed with a notch 21.

A slug 22 is mounted in each recess 19. Each slug is tapered with an included angle of $2a$. Each angled side of the slugs 22 is formed with a groove 23 within which is received an edge 20 of the bracket 18.

During manufacture of the support assembly, the slugs 22 are assembled with the bracket 18 and plastic material (e.g. Delrin or nylon) is injected from a central bore 24 of each slug 22 through small radial bores 25 into the space 26 between the edges 20 of the recess 19 and the grooves 23. The plastic material enters the notches 21, thereby forming connecting portions which normally prevent the slugs 22 from moving relatively to the bracket 18.

A steadying rod 27 extends substantially horizontally and transversely of the vehicle and is fixed to the forward end of the housing 14.

A pair of spaced apart support arms 28 are fixed to vehicle body structure and are formed with rearwardly opening notches 29.

When the steering column assembly is mounted in the vehicle, the steadying rod 27 is engaged with the notches 29 of the support arms 28 and the slugs 22 are then fixed to the vehicle body structure by bolts 30. The slugs 22 comprise part of the connecting means for securing the steering column assembly in a vehicle body.

OPERATION

When an impact load is imposed upon the steering wheel 16, the impact forces cause the connecting portions of plastic material in the notches 21 to be sheared thereby releasing the housing 14 and the upper steering column structure for forward movement relatively to the vehicle. The kinetic energy of the impacting object is absorbed by plastic deformation of the corrugated structure 10 as it collapses axially of the steering shaft 15.

It will be appreciated that the direction of the impact against the steering wheel 16 may be anywhere within the envelope indicated by the arrows 31 without producing side loads of the edges 20 against the slugs 22. This means that a substantially uniform breakaway force is provided by the support structure for a range of oblique impact conditions. The angle $a$ may, for example, be 15 degrees but larger angles may be used if desired.

The foregoing description presents the presently preferred embodiment of this invention. Modifications and alterations may occur to those skilled in the art that will come within the scope and spirit of the following claims.

We claim:

1. A breakaway support assembly for an energy absorbing steering column constructed to be mounted in a motor vehicle body, including:
   a support bracket secured to said steering column,
   said bracket having a rearwardly opening recess,
   said recess having a pair of lateral edges that diverge in a rearward direction,
   said recess having a greater lateral width at its rearward end than at its forward end,
   connecting means secured to said vehicle body and disposed in said recess,
   releasable means interposed between said connecting means and said edges of said recess, and
   said breakaway support assembly being constructed to permit the forward displacement of said steering column with respect to said vehicle body when subjected to a forwardly directed load above a predetermined minimum value.

2. A breakaway support assembly for an energy absorbing steering column mounted in a vehicle body, including:
   a bracket secured to said steering column,
   said bracket having laterally extending flange means,
   said flange means having a plurality of rearwardly opening recesses,
   each of said recesses having a pair of lateral edges that diverge in a rearward direction,
   each of said recesses having a greater lateral width at its rearward end than its forward end,
   a connecting means disposed in each of said recesses,
   frangible plastic means interposed between said connecting means and said edges and normally securing said connecting means to said flange means,
   said frangible plastic means being shearable when subjected to a force above a predetermined minimum value,
   means constructed to secure said connecting means to said vehicle body,
   said breakaway support assembly being constructed to secure said steering column to said vehicle body under normal operating conditions and to permit the forward displacement of said steering column with respect to said body when subjected to a forwardly directed impact load above a predetermined minimum value.

3. A breakaway support assembly for an energy absorbing steering column according to claim 2 and including:
   each of said connecting means having rearwardly diverging lateral sides,
   said diverging edges of said recesses being juxtaposed said diverging lateral sides of said connecting means.

4. A breakaway support assembly for an energy absorbing steering column constructed to be mounted in a vehicle body, including:
   a bracket secured to said steering column,
   said bracket having laterally extending flange means,
   said flange means having a plurality of rearwardly opening recesses,
   each of said recesses having a pair of lateral edges that diverge in a rearward direction,
   each of said recesses having a greater lateral width at its rearward end than at its forward end,
   a plurality of slug means with one slug means being disposed in each of said recesses,
   each of said slug means having rearwardly diverging grooves formed on the lateral sides thereof,
   said edges of said recesses being fitted in said grooves of said slug means,
   releasable means operatively interconnecting said slug means and said edges,
   said releasable means being constructed to permit the separation of said flange means from said slug means when subjected to a force above a predetermined minimum value,
   means securing said slug means to said vehicle body,
   said breakaway support assembly being constructed to secure said steering column to said vehicle body under normal operating conditions and to permit the forward displacement of said steering column with respect to said body when subjected to a forwardly directed impact load above a predetermined minimum value.

5. A breakaway support assembly for an energy absorbing steering column constructed to be mounted in a vehicle body, including:
   a bracket secured to said steering column,
   said bracket having laterally extending flange means,
   said flange means having rearwardly opening recesses,
   said recesses having rearwardly diverging edges,
   a plurality of slug means with one slug means being disposed in each of said recesses,
   each of said slug means having rearwardly diverging grooves formed on the lateral sides thereof,
   said edges of said slots being fitted in said grooves of said slug means,
   releasable means operatively interconnecting said slug means and said edges,
   said releasable means being constructed to permit the separation of said flange means from said slug means when subjected to a force above a predetermined minimum value,
   means securing said slug means to said vehicle body,
   said breakaway support assembly being constructed to secure said steering column to said vehicle body under normal operating conditions and to permit the forward displacement of said steering column with respect to said body when subjected to a forwardly directed impact load above a predetermined minimum value,
   said releasable means comprising frangible plastic means interposed between said slug means and said edges,
   said frangible plastic means being shearable when subjected to a force above a predetermined minimum value.

6. A breakaway support assembly for an energy absorbing steering column according to claim 5 and including:
   said edges having recess portions,
   said plastic means being disposed in said recess portions.

7. An energy absorbing steering column for a motor vehicle and having a plastically deformable section,
 a breakaway support assembly constructed to secure said steering column in the body portion of said vehicle,
 said assembly including a bracket rigidly secured to said steering column rearwardly of said plastically deformable section,
 said bracket having laterally extending flanges,
 said flanges each having at least one rearwardly opening recess,
 each of said recesses having rearwardly diverging edges,
 a plurality of slug means with one slug means being disposed in each of said recesses,
 each of said slug means having rearwardly diverging grooves formed on the lateral sides thereof,
 said edges of said recesses being fitted in said grooves of said slug means,
 frangible plastic means interposed between said slug means and said edges,
 said frangible plastic means being shearable when subjected to a force above a predetermined minimum value,
 means securing said slug means to said body portion of said vehicle,
 said breakaway support assembly being constructed to secure said steering column to said body portion under normal operating conditions and to permit the forward displacement of said steering column with respect to said body portion when subjected to a forwardly directed impact load above a predetermined minimum value.

* * * * *